(12) United States Patent  (10) Patent No.: US 9,118,813 B2
Park  (45) Date of Patent: Aug. 25, 2015

(54) METHOD AND APPARATUS FOR USING INTERNET PROTOCOL TELEVISION SERVICE BASED ON APPLICATION RECEIVED IN MULTICAST SESSION

(75) Inventor: Sung-Jin Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 483 days.

(21) Appl. No.: 12/472,403

(22) Filed: May 27, 2009

(65) Prior Publication Data

US 2009/0296707 A1 Dec. 3, 2009

Related U.S. Application Data

(60) Provisional application No. 61/056,165, filed on May 27, 2008.

(30) Foreign Application Priority Data

May 4, 2009 (KR) .................. 10-2009-0038950

(51) Int. Cl.
| | |
|---|---|
| H04L 12/28 | (2006.01) |
| H04N 7/173 | (2011.01) |
| H04N 21/434 | (2011.01) |
| H04N 21/643 | (2011.01) |
| H04L 29/06 | (2006.01) |

(52) U.S. Cl.
CPC ........ *H04N 7/17318* (2013.01); *H04L 65/1069* (2013.01); *H04L 65/4076* (2013.01); *H04N 21/4345* (2013.01); *H04N 21/643* (2013.01); *H04N 21/64322* (2013.01)

(58) Field of Classification Search
CPC .................................................. H04L 65/4076
USPC .................. 370/352, 390, 401; 709/203, 218; 725/82, 109, 133
See application file for complete search history.

(56) References Cited

U.S. PATENT DOCUMENTS

| | | | |
|---|---|---|---|
| 6,963,925 B1 | 11/2005 | Ishikawa et al. | |
| 7,877,085 B2 * | 1/2011 | Miyata | ........................ 455/414.3 |
| 8,027,274 B2 * | 9/2011 | Naito et al. | .................... 370/254 |
| 8,027,353 B2 * | 9/2011 | Damola et al. | ................ 370/401 |
| 8,316,082 B2 | 11/2012 | Igarashi | |
| 2005/0089036 A1 | 4/2005 | Lee et al. | |

(Continued)

FOREIGN PATENT DOCUMENTS

| | | |
|---|---|---|
| JP | 2001-7861 A | 1/2001 |
| JP | 2001-25134 A | 1/2001 |

(Continued)

OTHER PUBLICATIONS

International Search Report (PCT/ISA/210) dated Dec. 19, 2009, in International Application No. PCT/KR209/002792.

(Continued)

*Primary Examiner* — Man Phan
*Assistant Examiner* — Nourali Mansoury
(74) *Attorney, Agent, or Firm* — Sughrue Mion, PLLC

(57) ABSTRACT

Provided is a method and apparatus in which information about a multicast session which provides an application associated with a predetermined Internet protocol television (IPTV) service is received and the application is received in the multicast session established based on the received information.

18 Claims, 8 Drawing Sheets

(56) References Cited

U.S. PATENT DOCUMENTS

| | | | |
|---|---|---|---|
| 2006/0095628 | A1 | 5/2006 | Ludwig et al. |
| 2008/0104201 | A1 | 5/2008 | Moon et al. |
| 2009/0307307 | A1* | 12/2009 | Igarashi ............... 709/203 |
| 2012/0072967 | A1* | 3/2012 | Damola et al. ............ 725/148 |

FOREIGN PATENT DOCUMENTS

| | | | | |
|---|---|---|---|---|
| KR | 10-2005-0026752 A | | 3/2005 | |
| KR | 10-2008-0020805 A | | 3/2008 | |
| KR | 10-2008-0030375 A | | 4/2008 | |
| WO | WO2007078070 | * | 7/2007 | ............... H04N 5/50 |
| WO | 2007/102549 A1 | | 9/2007 | |
| WO | 2007/102550 A1 | | 9/2007 | |
| WO | 2007/140834 A1 | | 12/2007 | |

OTHER PUBLICATIONS

Communication dated Jul. 4, 2012 from the State Intellectual Property Office of P.R. China in a counterpart application No. 200980119802.1.

Communication dated Nov. 12, 2012 issued by the European Patent Office in European Application No. 09755019.8.

"Digital Video Broadcasting (DVB); Transport of MPEG-2 TS Based DVB Services over IP Based Networks"; Europeaan Broadcasting Union; Union Europeene de Radio-Television EB UUER; ETSI TS 102 034, IEEE, LIS, Sophia Antipolis Cedex, FR, vol. BC, No. V1.3.1, Oct. 1, 2007, XP014039760, pp. 1-128.

Deschanel, Muriel, "IPI Report to TM72", Digital Video Broadcasting, c/o EUB-17A Ancienne Route—CH-1218 grand Saconnex, Geneva—Switzerland, Sep. 25, 2007, XP017802073, pp. 1-35.

Digital Video Broadcasting (DVB): "Draft Integrated MHP Specification for IPTV", c/o EBU-17A Ancienne Route—CH-1218 Gran Saconnex, Geneva, Switzerland, Oct. 27, 2006, XP017810603, pp. 1-56.

Open IPTV: "Open IPTV Forum Functional Architecture V 1.1", Internet Citation, Jan. 15, 2008, XP007906507, pp. 1-141.

Paila, T., et al., "Flute—File Delivery over Undirectional Transport", Network Working Group, Oct. 1, 2004, XP015009699, pp. 1-35.

Communication dated Mar. 22, 2013 issued by the State Intellectual Property Office of P.R. China in counterpart Chinese Patent Application No. 200980119802.1.

Communication dated Jul. 4, 2012 issued by the State Intellectual Property Office of the People's Republic of China in counterpart Chinese Application No. 200980119802.1.

Communication dated Apr. 14, 2015, issued by the Korean Intellectual Property Office in application No. 10-2009-0038950.

Communication dated Jun. 24, 2015, issued by the State Intellectual Property Office of P.R. China in application No. 200980119802.1.

* cited by examiner

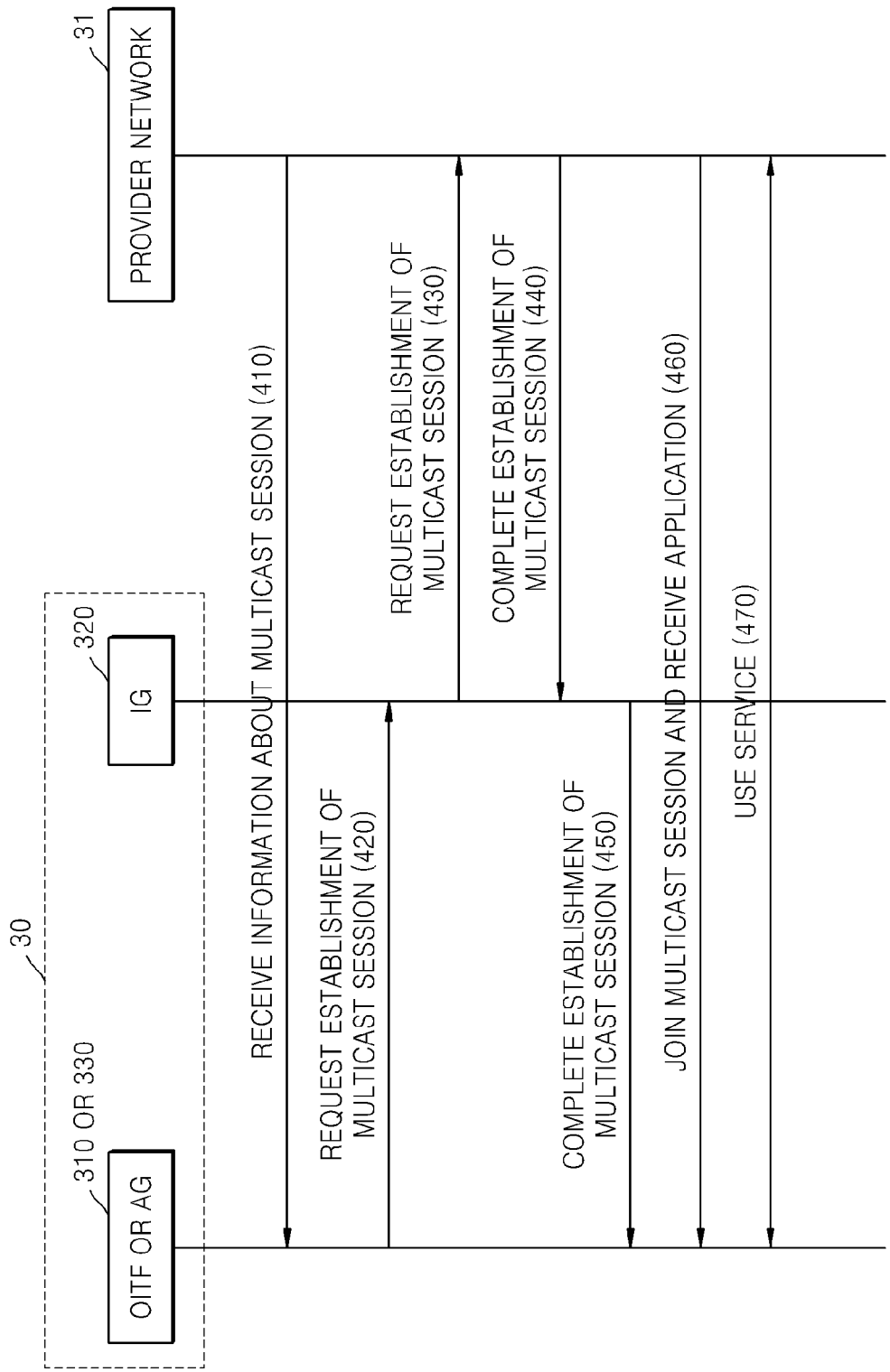

FIG. 5

```
<xsd:complexType name="FLUTEsessionDescriptor">
  <xsd:sequence>
    <xsd:element name="senderIP" type="xsd:string"/>
    <xsd:element name="numChannels" type="xsd:unsignedInt"/>
    <xsd:element name="destIP" type="xsd:string"/>
    <xsd:element name="TSI" type="xsd:unsignedInt"/>
    <xsd:element name="sessionTimeParam" type="xsd:string"/>
    <xsd:element name="lang" type="xsd:string"/>
  </xsd:sequence>
</xsd:complexType>
```

FIG. 6

HTTP Header:
```
POST IG_URI/SIP
Host: 192.168.1.1
X-OITF-Request_Line: INVITE sip:ApplicationServer@oipf.org
X-OITF-From: sip:david@oipf.org
X-OITF-To : sip:ApplicationServer@oipf.org
X-OITF-Contact : davic@oipf.org
X-OITF-Call_ID:abcdefg
X-OITF-Content_Type: application/sdp
X-OITF-Content_Length: 254 * SDP Length
Content-Type:application/sdp
Content-Length : 254 * SDP Length
```

HTTP Body:
```
a=source-filter: incl IN IP4 * 168.219.2.4 * Sender IP address
a=flute-ch:1 * Number of FLUTEChannel
m=application 12345 FLUTE/UDP 0 * Destination IP Address and Port
c=IN IP6 FF1E:03AD::7F2E:172A:1E24/1
a=flute-tsi:120 * FLUTE TSI(Transport Session Indentifier)
t=12948512345678 * Time (start time and endtime)
a=FEC-declaration:0 enconding-id=128; instance-id=0 * FEC realted paramenter
a=lang:EN-US *Language
a=avg-br:14000 * average bandwith
```

FIG. 7

SIP Header:
```
INVITE sip:ApplicationServer@oipf.org SIP/2.0
From: sip:david@oipf.org
To : sip:ApplicationServer@oipf.org
Contact : david@oipf.org
Call_ID:abcdefg
Content_Type: application/sdp
Content_Length: 254 * SDP Length
```

SIP Body:
```
a=source-filter: incl IN IP4 * 168.219.2.4 * Sender IP address
a=flute-ch:1 * Number of FLUTEChannel
m=application 12345 FLUTE/UDP 0 * Destination IP Address and Port
c=IN IP6 FF1E:03AD::7F2E:172A:1E24/1
a=flute-tsi:120 * FLUTE TSI(Transport Session Indentifier)
t=129485 12345678 * Time (start time and endtime)
a=FEC-declaration:0 enconding-id=128; instance-id=0 * FEC realted paramenter
a=lang:EN-US * Language
a=avg-br:14000 * average bandwith
```

FIG. 8

SIP Header:
```
SIP/2.0 200 O.K
From: sip:david@oipf.org
To : sip:ApplicationServer@oipf.org
Call_ID:abcdefg
CSeq: 23
Content_Type: application/sdp
Content_Length: 254 * SDP Length
```

SIP Body:
```
a=source-filter: incl IN IP4 * 168.219.2.4 * Sender IP address
a=flute-ch:1 * Number of FLUTEChannel
m=application 12345 FLUTE/UDP 0 * Destination IP Address and Port
c=IN IP6 FF1E:03AD::7F2E:172A:1E24/1
a=flute-tsi:120 * FLUTE TSI(Transport Session Indentifier)
t=129485 12345678 * Time (start time and endtime)
a=FEC-declaration:0 enconding-id=128; instance-id=0 * FEC realted paramenter
a=lang:EN-US * Language
a=avg-br:14000 * average bandwith
```

FIG. 9

```
HTTP/1.1 200 O.K
Host: 192.168.1.1
X-OITF-Response-Line: SIP/2.0 200 O.K:
X-OITF-From: sip:david@oipf.org
X-OITF-To : sip:ApplicationServer@oipf.org
X-OITF-Call_ID:abcdefg
X-OITF-CSeq: 23
X-OITF-Content_Type: application/sdp
X-OITF-Content_Length: 254 * SDP Length
Content-Type:application/sdp
Content-Length : 254 * SDP Length
```
(HTTP Header)

```
a=source-filter: incl IN IP4 * 168.219.2.4 * Sender IP address
a=flute-ch:1* Number of FLUTEChannel
m=application 12345 FLUTE/UDP 0 * Destinaton IP Address and Port
c=IN IP6 FF1E:03AD::7F2E:172A:1E24/1
a=flute-tsi:120 * FLUTE TSI(Transport Session Indentifier)
t=129485 12345678 * Time (start time and erdtime)
a=FEC-declaration:0 enconding-id=128; instance-id=0 * FEC realted paramenter
a=lang:EN-US * Language
a=avg-br:14000 * average bandwith
```
(HTTP Body)

METHOD AND APPARATUS FOR USING INTERNET PROTOCOL TELEVISION SERVICE BASED ON APPLICATION RECEIVED IN MULTICAST SESSION

CROSS-REFERENCE TO RELATED PATENT APPLICATION

This application claims the benefit of U.S. Provisional Application No. 60/056,165, filed on May 27, 2008, in the United States Patent and Trademark Office, and Korean Patent Application No. 10-2009-0038950, filed on May 4, 2009, in the Korean Intellectual Property Office, the disclosures of which are incorporated herein in their entireties by reference.

BACKGROUND OF THE INVENTION

1. Field of the Invention

The present invention relates to a method and apparatus for using an Internet protocol television (IPTV) service, and more particularly, to a method and apparatus for transmitting and receiving an application associated with an IPTV service.

2. Description of the Related Art

An Internet protocol television (IPTV) service refers to the delivery of services such as information, video contents, and broadcasting to a TV over an IP network, that is, a super-high-speed Internet network. Amid increasing interest in the IPTV service as integration of communication and broadcasting gets under way, it is expected that activation of the IPTV service will have considerable influence upon the industries of contents and home appliances as well as the industries of communication and broadcasting.

According to conventional arts, an IPTV user must have a different set-top box for a different IPTV vendor to receive an IPTV service over an IP network. In other words, only a user having an IPTV set-top box manufactured in accordance with a standard defined by an IPTV service provider can receive an IPTV service of the IPTV service provider. For example, if there are three IPTV service providers of companies A, B, and C, a service consumer purchasing a set-top box of the company A can use only an IPTV service of the company A and must have a separate set-top box of the company B or C in order to use an IPTV service of the company B or C. Such a problem of compatibility between an IPTV service and a set-top box reduces service consumers' choices, deteriorating the quality of the IPTV service or hindering the expansion of the IPTV service base.

To solve the compatibility problem, the Open IPTV Forum has recently been formed and is discussing standardization. This Forum is establishing a common standard which is not dependent on IPTV service providers and a discussion for providing IPTV services to service consumers based on the common standard is under way.

The Open IPTV Forum aims to allow users to easily use IPTV services provided by a plurality of IPTV service providers by making an interface and a hardware platform which are not dependent on the IPTV service providers. According to the Open IPTV functional architecture, a user can use IPTV services provided by a plurality of different IPTV service providers without needing to have different set-top boxes for the different IPTV service providers, whereby the user can have more choices between services.

In order to allow a user to use services provided by a plurality of different IPTV service providers, in a residential network of the Open IPTV functional architecture, there are such entities for relaying the plurality of IPTV service providers as application gateway (AG), IMS gateway (IG), and a Content and Service Protection (CSP) gateway (CG) entities. These relaying entities receive an IPTV service provided from a provider network which is located outside the residential network, and relay the IPTV service to a terminal entity located inside the residential network.

SUMMARY OF THE INVENTION

The present invention provides a method and apparatus for transmitting and receiving an application associated with an IPTV service, and a computer-readable recording medium having recorded thereon a program for executing the method.

According to an aspect of the present invention, there is provided a method of using an Internet protocol television (IPTV) service by a client, the method including receiving information about a multicast session which provides an application associated with the IPTV service from a first server, requesting a second server to establish the multicast session based on the received information, and receiving the application in the multicast session established according to the requesting.

The receiving of the information about the multicast session may include receiving an extensible markup language (XML) document which includes at least one of an IP address of a server which provides the application, the number of channels used for the multicast session, and an identifier of the multicast session.

The receiving of the information about the multicast session may include receiving a moving picture experts group (MPEG)2-transport stream (TS) which includes at least one of an IP address of a server which provides the application, the number of channels used for the multicast session, and an identifier of the multicast session.

The multicast session may be an IP multicast session according to an IP multimedia subsystem (IMS).

According to another aspect of the present invention, there is provided a method of receiving an application associated with an Internet protocol television (IPTV) service by a first entity, the method including receiving information about a multicast session which provides the application from a second entity located outside a residential network, requesting a gateway entity of the residential network to establish the multicast session, and receiving data of the application from a third entity in the multicast session established according to the requesting, in which the gateway entity requests an entity which manages a session associated with the IPTV service to establish the multicast session.

According to another aspect of the present invention, there is provided a client which uses an Internet protocol television (IPTV) service, the client including a session information receiving unit receiving information about a multicast session which provides an application associated with the IPTV service from a first server, and a session requesting unit requesting a second server to establish the multicast session based on the received information, and an application receiving unit receiving data of the application in the multicast session established according to the requesting.

According to another aspect of the present invention, there is provided a system which uses an Internet protocol television (IPTV) service, the system including a first entity receiving information about a multicast session which provides an application from a second entity located outside a residential network and requesting a gateway entity of the residential network to establish the multicast session, and the gateway entity requesting an entity which manages a session associated with the IPTV service to establish the multicast session, in which the first entity receives data of the application from a third entity in the multicast session established according to the requesting.

According to another aspect of the present invention, there is provided a computer-readable recording medium having recorded thereon a program for executing the method of using an IPTV service and the method of receiving an application.

BRIEF DESCRIPTION OF THE DRAWINGS

The above and other features and advantages of the present invention will become more apparent by describing in detail exemplary embodiments thereof with reference to the attached drawings in which:

FIG. 4 illustrates a flow diagram for explaining a method of using a service according to another exemplary embodiment of the present invention;

FIG. 5 illustrates information about a multicast session which provides an application according to an exemplary embodiment of the present invention;

FIG. 6 illustrates a message requesting establishment of a multicast session, which is transmitted and received between entities of a residential network, according to an exemplary embodiment of the present invention;

FIG. 7 illustrates a message requesting establishment of a multicast session, which is transmitted from an entity of a residential network to an entity of a provider network, according to an exemplary embodiment of the present invention;

FIG. 8 illustrates a response message indicating completion of establishment of a multicast session, which is transmitted from an entity of a provider network to an entity of a residential network, according to an exemplary embodiment of the present invention; and FIG. 9 illustrates a response message indicating completion of establishment of a multicast session, which is transmitted between entities of a residential network, according to an exemplary embodiment of the present invention.

DETAILED DESCRIPTION OF THE INVENTION

Hereinafter, exemplary embodiments of the present invention will be described in detail with reference to the accompanying drawings.

Figure 1:
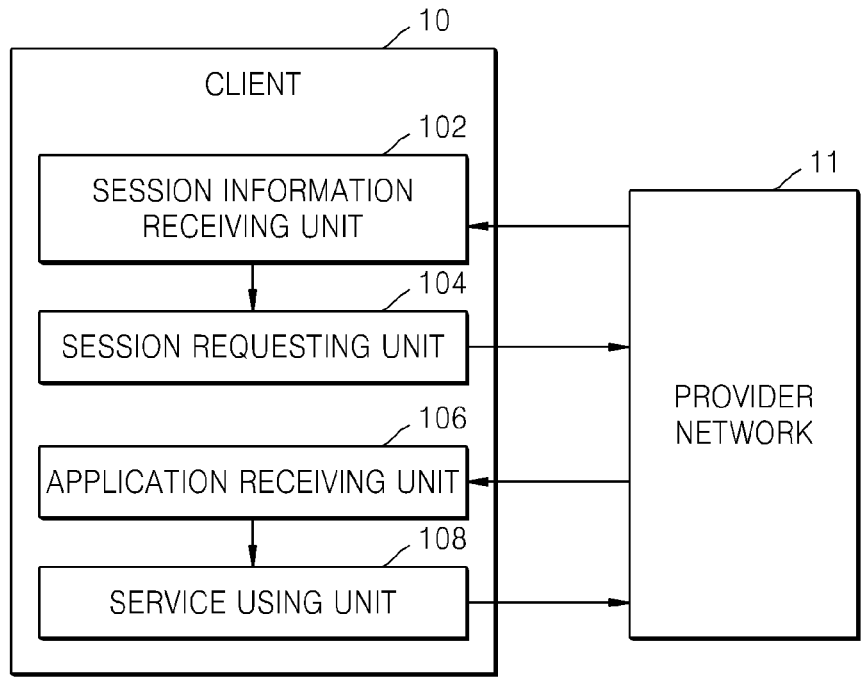
FIG. 1 illustrates a client according to an exemplary embodiment of the present invention.

FIG. 1 illustrates a client 10 according to an exemplary embodiment of the present invention.

Referring to FIG. 1, the client 10 includes a session information receiving unit 102, a session requesting unit 104, an application receiving unit 106, and a service using unit 108. Although an Internet protocol television (IPTV) service is used as an example of a service in the following description, those of ordinary skill in the art will easily know that a method and apparatus for using a service according to the present invention can also be applied to different types of services than the IPTV service.

The session information receiving unit 102 receives, from a first server (not shown) of a provider network 11, information about a session in which an application associated with an IPTV service can be received. The session may be a session, such as a file delivery over unidirectional transport (FLUTE) session, for transmitting a file associated with an application in a multicast manner. The IPTV service may include at least one of broadcasting, content on demand (CoD), Push CoD, content download, network personal video recording (PVR), messaging, web services, and the like. In general, the client 10 using the IPTV service has already embedded therein the application associated with the IPTV service. However, when the application associated with the IPTV service is updated after release, or a new IPTV service is provided, the client 10 may have to receive a new application aside from the embedded application.

Thus, for reception of an application, the session information receiving unit 102 receives information about a multicast session which provides the application from the first server of the provider network 11. Herein, the first server may be an entity which transmits information about an IPTV service provided by the provider network 11 and information about a multicast session which provides an application associated with the IPTV service to the client 10 according to the Open IPTV functional architecture.

The information about the multicast session may be provided to the client 10 through an extensible mark-up language (XML) document or through an application information table (AIT) or extended application information table (XAIT) of a moving picture experts group (MPEG)2-transport stream (TS). The information about the multicast session will be later described in detail with reference to FIG. 3.

The session requesting unit 104 requests a second server (not shown) of the provider network 11 to establish a multicast session which provides an application. In a multicast session over an IP network, a bandwidth is allocated to each of clients joining the session. Thus, the session requesting unit 104 requests to the second server, which manages the multicast session, to permit joining in the multicast session and allocate a bandwidth. In particular, since in an IP multicast session according to an IP multimedia subsystem (IMS), a quality of service (QoS) of data transmission can be guaranteed for only a client which requests establishment of the multicast session and is allocated a bandwidth, the session requesting unit 104 requests the second server to establish the multicast session based on the information about the multicast session, received by the session information receiving unit 102.

Herein, the second server may be an entity which performs authentication and session management to control access to the IPTV service provided by the provider network 11 according to the Open IPTV functional architecture.

The application receiving unit 106 receives a predetermined application in the multicast session established at the request of the session requesting unit 104. More specifically, the application receiving unit 106 receives the predetermined application from a third server which provides an application associated with an IPTV service provided by the provider network 11.

Herein, the third server may be an entity which has an application associated with an IPTV service according to the Open IPTV functional architecture.

The service using unit 108 uses the IPTV service by driving the application received by the application receiving unit 106.

According to the Open IPTV functional architecture, the first server, the second server, and the third server are separate entities which execute their functions. However, the first server, the second server, and the third server do not have to be physically separated entities and may execute their functions as one or two physically separated entities.

Figure 2:
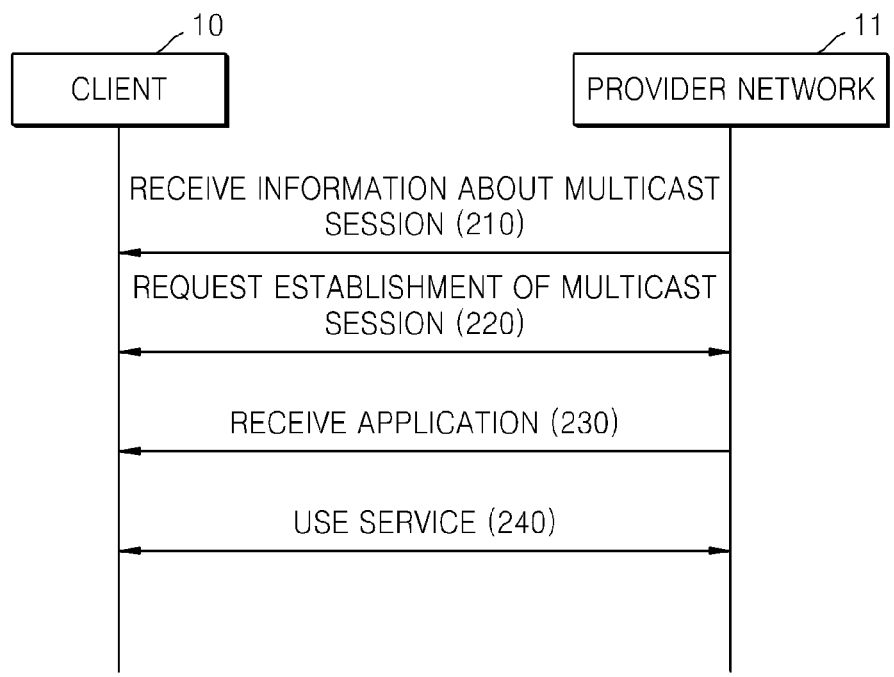
FIG. 2 illustrates a flow diagram for explaining a method of using a service according to an exemplary embodiment of the present invention.

FIG. 2 illustrates a flow diagram for explaining a method of using a service according to an exemplary embodiment of the present invention.

Referring to FIG. 2, in operation 210, the client 10 receives information about a multicast session which provides an application associated with a predetermined IPTV service from the first server of the provider network 11. As previously described, the information about the multicast session may be provided to the client 10 through an XML document or through an AIT or XAIT of an MPEG2-TS.

In operation 220, the client 10 requests the second server to establish the multicast session and receives a response to the request from the second server. More specifically, the client 10 requests the second server to establish the multicast session which provides an application required for using the predetermined IPTV service based on the information received in operation 210, and receives a response to the request from the second server.

In operation 230, the client 10 receives the application in the multicast session established in operation 220. More specifically, the client 10 receives the application from the third server which provides at least one application associated with at least one IPTV service provided by the provider network 11.

In operation 240, the client 10 uses the IPTV service by driving the application received in operation 230.

Figure 3:
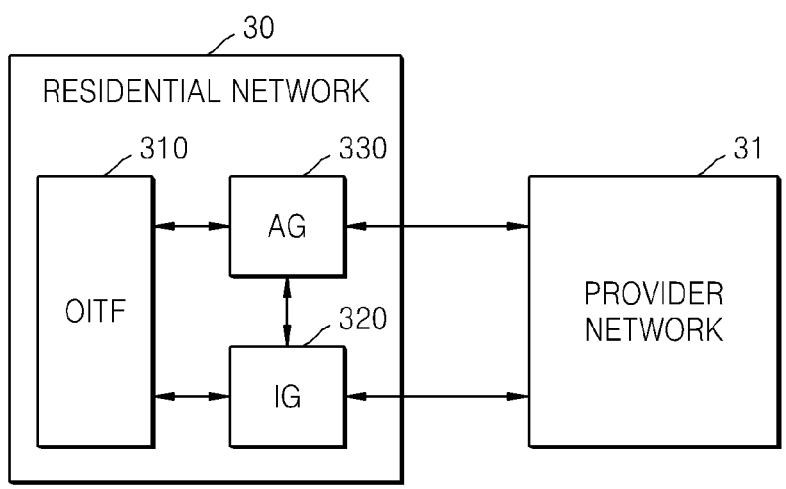
FIG. 3 illustrates a plurality of entities of a residential network according to an exemplary embodiment of the present invention.

FIG. 3 illustrates a plurality of entities 310 to 330 of a residential network 30 according to an exemplary embodiment of the present invention.

In FIG. 3, the plurality of entities 310 to 330 of the residential network 30 operate as the client 10 illustrated in FIG. 1 according to the Open IPTV functional architecture.

Referring to FIG. 3, the residential network 30 according to an exemplary embodiment of the present invention includes an Open IPTV terminal functional (OITF) entity 310, an IMS Gateway (IG) entity 320, and an application gateway (AG) entity 330 according to the Open IPTV functional architecture.

The OITF entity 310 ultimately consumes an IPTV service provided by a provider network 31. The OITF entity 310 consumes an IPTV service provided by at least one IPTV service provider of the provider network 31 through interaction with a user. A device which displays a predetermined user interface and receives a user's input according to a display result, such as a TV, may be the OITF entity 310.

The IG entity 320 is a device which relays an access of the OITF entity 310 to an IPTV service. The IG entity 320 receives an IPTV service provided from the provider network 31 and relays the IPTV service to the OITF entity 310. The IG entity 320 communicates with an entity or entities of the provider network 31 at the request of the OITF entity 310 to establish a session according to the IMS for an IPTV service, receives the IPTV service in the established session, and relays the IPTV service to the OITF entity 310.

The AG entity 330 is an entity which receives an application associated with an IPTV service and relays the application to the OITF entity 310. The AG entity 330, which is an optional entity, may change an application received from an entity of the provider network 31 and relay the changed application to the OITF entity 310. For example, the AG entity 330 may change the received application by adding a procedural language to or inserting personalized advertisements into the received application and then provide the changed application to the OITF entity 310.

A method of receiving an application associated with an IPTV service and a method of using the IPTV service by driving the received application, by the OITF entity 310, the IG entity 320, and the AG entity 330 illustrated in FIG. 3 will be described below in detail with reference to FIG. 4.

FIG. 4 illustrates a flow diagram for explaining a method of using a service according to another exemplary embodiment of the present invention.

Referring to FIG. 4, in operation 410, the OITF entity 310 or the AG entity 330 receives information about a multicast session which provides an application associated with an IPTV service from a predetermined entity of the provider network 31.

When receiving information about an IPTV service from an IPTV service discovery entity of the provider network 31, the OITF entity 310 or the AG entity 330 may receive the information about the multicast session which provides the application associated with the IPTV service together with the information about the IPTV service.

According to the Open IPTV functional architecture, the OITF entity 310 of the residential network 30 searches a plurality of IPTV service providers to use an IPTV service and then discovers the IPTV service of the found IPTV service provider. In a method of using a service according to an exemplary embodiment of the present invention, the OITF entity 310 may receive the information about the multicast session which provides the application associated with the IPTV service when receiving the discovery result of the IPTV service from the IPTV service discovery entity.

As mentioned above, the information about the multicast session may be provided to the OITF entity 310 or the AG entity 330 through an XML document or through an AIT or an XAIT of an MPEG2-TS.

FIG. 5 illustrates information about a multicast session which provides an application according to an exemplary embodiment of the present invention.

Referring to FIG. 5, the information about the multicast session, transmitted and received in operation 210 of FIG. 2 or operation 410 of FIG. 4, may be included in an XML document.

An element "senderIP" indicates information about an IP address of an entity which provides an application, and an element "numChannels" indicates information about the number of channels used for a multicast session which provides an application. An element "destIP" indicates information about an IP address and a port of an entity which receives an application, and an element "TSI" indicates information about an identifier of a multicast session. An element "sessionTimeParam" indicates information about the start and end times of a multicast session, and an element "lang" indicates information about a language.

The XML document may include information about forward error correction (FEC) of application data and information about a protocol used for a session. The information included in the XML document may be described according to a session description protocol (SDP).

In operation 420, the OITF entity 310 or the AG entity 330 requests the IG entity 320 to establish the multicast session associated with the IPTV service based on the information about the multicast session received in operation 410. Since the QoS of data transmission can be guaranteed for an IP multicast session of an IMS network, the OITF entity 310 or the AG entity 330 requests the IG entity 320, to establish an IP multicast session.

Due to a limited bandwidth of an entity which transmits data in an IP multicast session, as the number of entities joining the IP multicast session increases, the QoS of data transmission may not be guaranteed. However, by receiving information about a multicast session before joining in the multicast session and establishing the multicast session of an IMS network based on the received information according to an exemplary embodiment of the present invention, data transmission having a guaranteed QoS is possible. With data transmission having a guaranteed QoS, the satisfaction of an IPTV service user increases, contributing to the expansion of the IPTV service base and the development of related industries.

The OITF entity 310 or the AG entity 330 transmits a predetermined message to the IG entity 320 according to an interface for interaction between entities defined in the Open IPTV functional architecture in order to request establishment of a multicast session, as will be described in detail with reference to FIG. 6.

FIG. 6 illustrates a message requesting establishment of a multicast session, which is transmitted and received between entities of the residential network 30, according to an exemplary embodiment of the present invention.

Referring to FIG. 6, in operation 420, the OITF entity 310 or the AG entity 330 transmits an HTTP request message to the IG entity 320 of the residential network 30.

Once the HTTP request message requesting establishment of a multicast session is generated based on the information about the multicast session which provides an application, received in operation 410, the generated HTTP request message is transmitted to the IG entity 320.

As illustrated in FIG. 6, a header of the HTTP request message includes content of a session initiation protocol (SIP) header which is transmitted by the IG entity 320 to an entity of the provider network 31 for establishment of the multicast session.

Information about a type of an SIP message, information about a receiver, information about a sender, and information about a content type indicating that content included in an SIP body is information about a multicast session according to a session description protocol (SDP) may be included in the SIP header.

A body of the HTTP request message includes detailed information about the multicast session whose establishment is requested by the OITF entity 310 or the AG entity 330. In FIG. 6, the HTTP body includes an IP address of an entity which provides an application in a multicast session, a channel number of a multicast session which provides an application, an IP address of the OITF entity 310 or the AG entity 330, and a number of a port used for a multicast session.

Referring back to FIG. 4, in operation 430, the IG entity 320 requests a predetermined entity of the provider network 31 to establish a multicast session which provides an application. More specifically, the IG entity 320 requests an authentication and session management (ASM) entity of the provider network 310 to establish a multicast session.

According to the Open IPTV functional architecture, the ASM entity authenticates a user accessing an IPTV service and performs session management for coordination and management of user activities. Thus, the IG entity 320 requests the ASM entity of the provider network 31 to establish a multicast session which provides an application, based on the information about the multicast session, received from the OITF entity 310 or the AG entity 330 in operation 420, as will be described in detail with reference to FIG. 7.

FIG. 7 illustrates a message requesting establishment of a multicast session, which is transmitted from an entity of the residential network 30 to an entity of the provider network 31, according to an exemplary embodiment of the present invention.

Referring to FIG. 7, in operation 430, the IG entity 330 transmits an SIP INVITE message, generated according to the Open IPTV functional architecture, to the ASM entity of the provider network 31.

The IG entity 330 generates the SIP INVITE message requesting establishment of a multicast session based on the HTTP request message transmitted from the OITF entity 310 or the AG entity 330 to the IG entity 330 in operation 420, and then transmits the generated SIP INVITE message to the ASM entity. As illustrated in FIG. 7, information included in a header of the SIP INVITE message is the same as information included in the header of the HTTP request message illustrated in FIG. 6, and information included in a body of the SIP INVITE message is the same as information included in the body of the HTTP request message illustrated in FIG. 6.

Referring back to FIG. 4, in operation 440, the predetermined entity of the provider network 31 transmits, to the IG entity 320, a message indicating that establishment of a multicast session which provides an application has been completed in response to the request for establishment of the multicast session made in operation 420. The predetermined entity which transmits the message indicating completion of establishment of the multicast session may be the ASM entity.

Once the IG entity 320 transmits the message requesting establishment of the multicast session to the ASM entity of the provider network 31 in operation 430, the ASM entity transmits a response message responding to the request message to the IG entity 320 in operation 440, as will be described in detail with reference to FIG. 8.

FIG. 8 illustrates a response message indicating completion of establishment of a multicast session, which is transmitted from an entity of the provider network 31 to an entity of the residential network 30, according to an exemplary embodiment of the present invention.

Referring to FIG. 8, the ASM entity of the provider network 31 transmits an SIP response message to the IG entity 320 in operation 440. The ASM entity establishes a multicast session which provides an application to the OITF entity 310 or the AG entity 330 of the residential network 30 according to the SIP INVITE message received in operation 430 and transmits an SIP response message indicating completion of establishment of the multicast session to the IG entity 320.

As illustrated in FIG. 8, information included in a header of the SIP response message is the same as information included in the header of the SIP INVITE message illustrated in FIG. 7 and information included in a body of the SIP response message is the same as information included in the body of the SIP INVITE message illustrated in FIG. 7.

Referring back to FIG. 4, in operation 450, the IG entity 320 informs the OITF entity 310 or the AG entity 330 that establishment of the multicast session which provides the application associated with the IPTV service has been completed.

The IG entity 320 converts the SIP response message indicating completion of establishment of the multicast session into an HTTP response message and transmits the HTTP response message to the OITF entity 310 or the AG entity 330, as will be described in detail with reference to FIG. 9.

FIG. 9 illustrates a response message indicating completion of establishment of a multicast session, which is transmitted between entities of the residential network 30, according to an exemplary embodiment of the present invention.

As illustrated in FIG. 9, information included in a header of the HTTP response message is the same as information included in the header of the SIP response message illustrated in FIG. 8 and information included in a body of the HTTP response message is the same as information included in the body of the SIP response message illustrated in FIG. 8.

In operation 460, the OITF entity 310 or the AG entity 320 joins the multicast session established in operations 410 to 450 and receives the application associated with the IPTV service from the predetermined entity of the provider network 31.

The predetermined entity of the provider network 31, which provides the application, may be an IPTV application entity.

According to the Open IPTV functional architecture, the OITF entity 310 or the AG entity 330 receives an application associated with an IPTV service from the IPTV application entity which has applications associated with content on demand (CoD), content download, network private video recording (PVR), and the like.

The application associated with the IPTV service may be received from the IPTV application entity through a content delivery network (CDN) entity. The OITF entity 310 or the AG entity 320 receives the application of the IPTV application entity through the CDN entity under the control of an IPTV control entity.

In operation 470, the OITF entity 310 or the AG entity 330 uses the predetermined IPTV service by driving the application associated with the IPTV service, received in operation 360.

While the present invention has been particularly shown and described with reference to exemplary embodiments thereof, it will be understood by those of ordinary skill in the art that various changes in form and details may be made therein without departing from the spirit and scope of the present invention as defined by the following claims. Accordingly, the spirit of the present invention should be covered by the following claims and equivalents or equivalent modifications thereof should be regarded as falling within the scope of the spirit of the present invention. A system according to the present invention can also be implemented as a computer-readable code on a computer-readable recording medium.

For example, an apparatus according to exemplary embodiments of the present invention may include a bus coupled to units of devices illustrated in FIGS. 1 and 3 and at least one processor combined with the bus. The apparatus may further include a memory coupled to at least one process, which is combined with the bus to store commands and received or generated messages and executes the commands.

The computer-readable recording medium is any data storage device that can store data which can be thereafter read by a computer system. Examples of computer-readable recording media include read-only memory (ROM), random access memory (RAM), CD-ROMs, magnetic tapes, floppy disks, optical data storage devices, and carrier waves such as transmission over the Internet. The computer-readable recording medium can also be distributed over a network of coupled computer systems so that the computer-readable code is stored and executed in a decentralized fashion.

What is claimed is:

1. A method of using an Internet protocol television (IPTV) service by a client, the method comprising:
receiving information about a multicast session from a first server, wherein the multicast session provides an application associated with the IPTV service;
requesting a second server to establish the multicast session and allocate a bandwidth of the client based on the received information;
receiving a response message including information indicating that an establishment of the multicast session has been completed; and
receiving the application in the multicast session established according to the request to the second server,
wherein the information about the multicast session comprises at least one of
information about an IP address of the second server,
information about a number of channels used for the multicast session,
information about an IP address of the client,
information about an identifier of the multicast session, and
information about start time and end time of the multicast session,
wherein the first server is a server for discovering the IPTV service from among a plurality of IPTV services, and
the second server is a server for performing session management associated with the IPTV service.

2. The method of claim 1, wherein the receiving of the information about the multicast session comprises receiving a moving picture experts group (MPEG)2-transport stream (TS) which comprises at least one of the IP address of the second server which provides the application, the number of channels used for the multicast session, and the identifier of the multicast session.

3. The method of claim 1, further comprising using the IPTV service by driving the received application.

4. The method of claim 1, wherein the multicast session is an IP multicast session according to an IP multimedia subsystem (IMS).

5. The method of claim 1, wherein the multicast session established according to the request to the second server has a guaranteed quality of service (QoS) of data transmission.

6. A method of receiving an application associated with an Internet protocol television (IPTV) service by a first entity, the method comprising:
receiving information about a multicast session from a second entity located outside a residential network, wherein the multicast session provides the application;
requesting a gateway entity of the residential network to establish the multicast session and allocate a bandwidth of the first entity based on the received information;
receiving a response message including information indicating that an establishment of the multicast session has been completed; and
receiving data of the application from a third entity outside the residential network in the multicast session established according to the request to the gateway entity,
wherein the gateway entity requests a fourth entity to establish the multicast session, and the fourth entity is outside the residential network and manages a session associated with the IPTV service, and
wherein the information about the multicast session comprises at least one of
information about an IP address of the third entity,
information about a number of channels used for the multicast session,
information about an IP address of the first entity,
information about an identifier of the multicast session, and
information about start time and end time of the multicast session,
wherein the gateway entity is an entity for performing session management associated with the IPTV service, and
the second entity is an entity for discovering the IPTV service from among a plurality of IPTV services.

7. The method of claim 6, wherein the receiving of the information about the multicast session comprises receiving a moving picture experts group (MPEG)2-transport stream (TS) which comprises at least one of the IP address of the third entity, the number of channels used for the multicast session, and the identifier of the multicast session.

8. The method of claim 6, wherein the multicast session is an IP multicast session according to an IP multimedia subsystem (IMS).

9. The method of claim 6, wherein the multicast session established according to the request to the gateway entity has a guaranteed quality of service (QoS) of data transmission.

10. A client which uses an Internet protocol television (IPTV) service, the client comprising:
    a session information receiving unit that receives information about a multicast session from a first server, wherein the multicast session provides an application associated with the IPTV service;
    a session requesting unit that requests a second server to establish the multicast session and allocate a bandwidth of the client based on the received information;
    a message receiving unit that receives a response message including information indicating that an establishment of the multicast session has been completed in response to the request to the second server; and
    an application receiving unit that receives data of the application in the multicast session established according to the request to the second server,
    wherein the information about the multicast session comprises at least one of
    information about an IP address of the second server,
    information about a number of channels used for the multicast session,
    information about an IP address of the client,
    information about an identifier of the multicast session, and
    wherein the first server is a server for discovering the IPTV service from among a plurality of IPTV services, and
    the second server is a server for performing session management associated with the IPTV service.

11. The client of claim 10, further comprising a service using unit that uses the IPTV service by driving the received application.

12. The client of claim 10, wherein the multicast session established according to the request to the second server has a guaranteed quality of service (QoS) of data transmission.

13. A system which uses an Internet protocol television (IPTV) service, the system comprising:
    a first entity that receives information about a multicast session from a second entity located outside a residential network and requests a gateway entity of the residential network to establish the multicast session based on the received information,
    wherein the multicast session provides an application,
    wherein the gateway entity transmits a message requesting establishment of the multicast session and allocation of a bandwidth of the first entity to a third entity, and the third entity is outside the residential network and manages a session associated with the IPTV service, and
    wherein the first entity receives data of the application from a fourth entity outside the residential network in the multicast session established according to the request to the gateway entity, and
    wherein the information about the multicast session comprises at least one of
    information about an IP address of the third entity,
    information about a number of channels used for the multicast session,
    information about an IP address of the first entity,
    information about an identifier of the multicast session, and
    information about start time and end time of the multicast session,
    wherein the gateway entity is an entity for performing session management associated with the IPTV service, and
    the second entity is an entity for discovering the IPTV service from among a plurality of IPTV services.

14. The system of claim 13, wherein the first entity receives a moving picture experts group (MPEG)2-transport stream (TS) which comprises at least one of the IP address of the third entity, the number of channels used for the multicast session, and the identifier of the multicast session.

15. The system of claim 13, wherein the multicast session is an IP multicast session according to an IP multimedia subsystem (IMS).

16. The system of claim 13, wherein the multicast session established according to the request to the gateway entity has a guaranteed quality of service (QoS) of data transmission.

17. A non-transitory computer-readable recording medium having recorded thereon a program for executing a method of using an Internet protocol television (IPTV) service, the method comprising:
    receiving information about a multicast session from a first server, wherein the multicast session provides an application associated with the IPTV service;
    requesting a server to establish the multicast session and allocate a bandwidth of a client based on the received information;
    receiving a response message including information indicating that an establishment of the multicast session has been completed; and
    receiving the application in the multicast session established according to the request,
    wherein the information about the multicast session comprises at least one of
    information about an IP address of the second server,
    information about a number of channels used for the multicast session,
    information about an IP address of the client,
    information about an identifier of the multicast session, and
    information about start time and end time of the multicast session,
    wherein the first server is a server for discovering the IPTV service from among a plurality of IPTV services, and
    the second server is a server for performing session management associated with the IPTV service.

18. A non-transitory computer-readable recording medium having recorded thereon a program for executing a method of receiving an application associated with an Internet protocol television (IPTV) service by a first entity, the method comprising:
    receiving information about a multicast session from a second entity located outside a residential network, wherein the multicast session provides the application;
    requesting a gateway entity of the residential network to establish the multicast session and allocate a bandwidth of the first entity based on the received information;
    receiving a response message including information indicating that an establishment of the multicast session has been completed; and
    receiving data of the application from a third entity outside the residential network in the multicast session established according to the request,
    wherein the gateway entity requests a fourth entity to establish the multicast session, and the fourth entity is outside the residential network and manages a session associated with the IPTV service, and
    wherein the information about the multicast session comprises at least one of information about an IP address of the third entity,
information about a number of channels used for the multicast session,
information about an IP address of the first entity,
information about an identifier of the multicast session, and
information about start time and end time of the multicast session,
wherein the gateway entity is an entity for performing session management associated with the IPTV service, and
the second entity is an entity for discovering the IPTV service from among a plurality of IPTV services.

* * * * *